United States Patent

[11] 3,579,254

[72] Inventors Doyle V. Carmody;
John S. Welch, Milan, Tenn.
[21] Appl. No. 678,804
[22] Filed Oct. 30, 1967
[45] Patented May 18, 1971
[73] Assignee International Telephone and Telegraph Corporation

[54] CALLING SUBSCRIBER PARTY LINE IDENTIFICATION CIRCUIT
1 Claim, 1 Drawing Fig.

[52] U.S. Cl. .......... 179/17
[51] Int. Cl. .......... H04m 13/00
[50] Field of Search .......... 179/17.1

[56] References Cited
UNITED STATES PATENTS
2,562,594 7/1951 Bielenberg .......... 179/17
2,824,173 2/1958 Meacham .......... 179/17
3,278,687 10/1966 Everett .......... 179/17
FOREIGN PATENTS
1,028,381 5/1966 Great Britain .......... 179/17

*Primary Examiner*—Kathleen H. Claffy
*Assistant Examiner*—Jan S. Black
*Attorneys*—C. Cornell Remsen, Jr., Rayson P. Morris, Percy P. Lantzy, J. Warren Whitesel, Phillip A. Weiss and Delbert P. Warner

ABSTRACT: One party on a two-party line is connected in series with a diode circuit across the tip and ring lines. The diodes have a breakdown voltage above the level of AC tone from a central office and the tone does not pass through. The other party is connected directly across the tip and ring lines and AC tone transmitted to it when the hookswitch is "off" is transmitted through to a control circuit. The control circuit senses the presence or lack of tone and provides appropriate control signals which can be used to supply or control an indication of which is the calling party to the toll center.

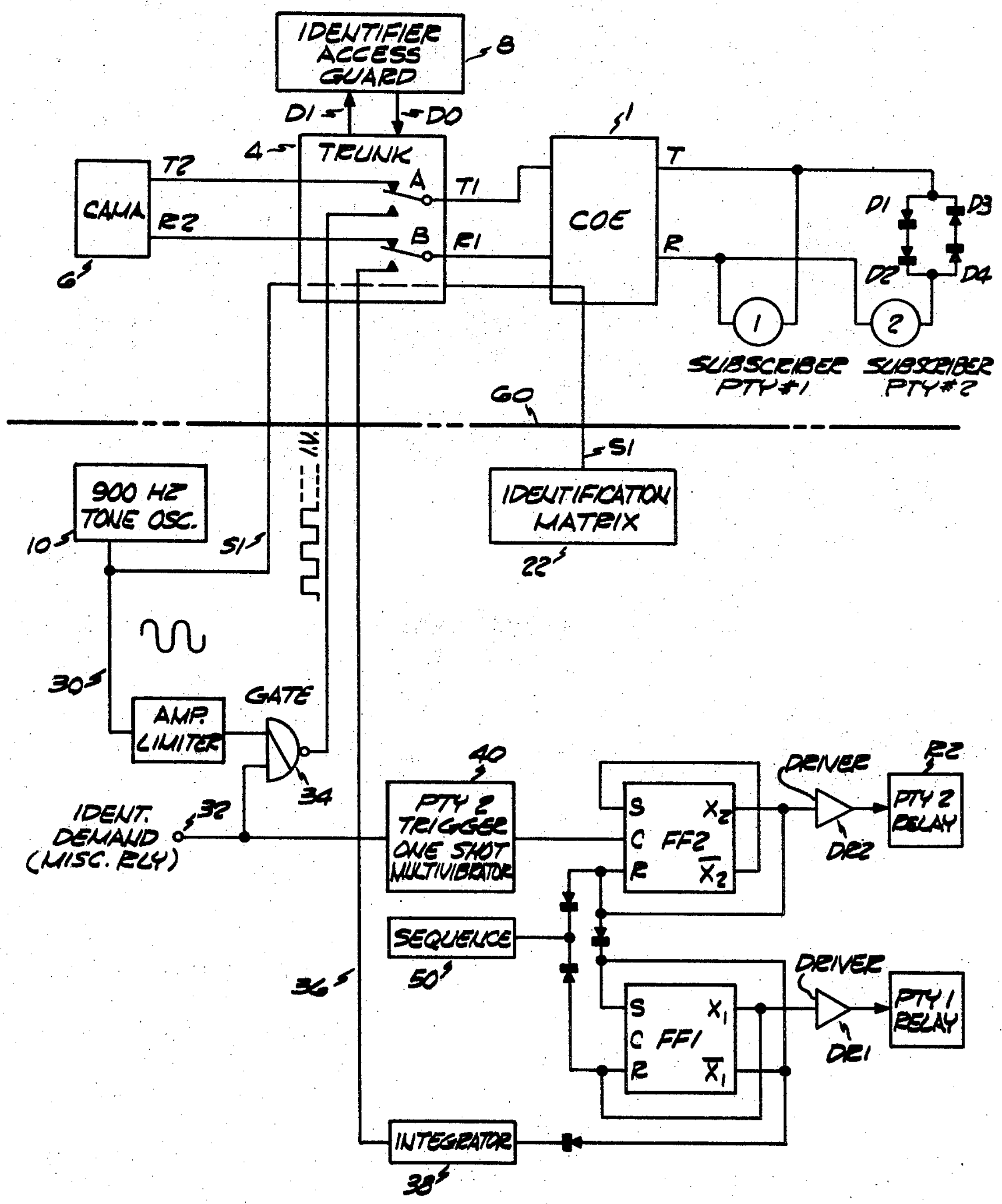
INVENTORS
J. S. WELCH, D. V. CARMODY
BY
Delbert J. Warner

CALLING SUBSCRIBER PARTY LINE IDENTIFICATION CIRCUIT

The invention is related to a U.S. Pat. application entitled "-Calling Subscriber Identification Circuit," Ser. No. 581,371 filed on Sept. 22, 1966 in the names of J. L. Stepan, D. V. Carmody, J. S. Welch and A. A. Unseren, now U.S. Pat. No. 3,522,385.

At the present time, in the United States, the bulk of all long distance calls pass through long lines controlled by the Bell System. This System incorporates toll determining equipment (such as that called CAMA, an acronym for "Centralized Automatic Message Accounting") which has proven satisfactory for that System when it uses its own identification equipment. However, when independent telephone companies connect into the Bell System long lines equipment, compatibility requires the independents to provide essentially the same type of identification to the CAMA. In many cases, compatibility has not been achieved and the independents have required the service of an operator even when direct dialling would otherwise be feasible. The invention disclosed in the U.S. Pat. application No. 581,371, referred to above, affords a solution to this problem. However, that invention does not provide for full identification of a party in a two-party line system.

A primary object of the present invention is to provide means for automatically supplying identification of a calling party on a two-party line system to toll determining equipment and more particularly to provide identification which is compatible with CAMA equipment.

The foregoing object and others ancillary thereto may be attained by an identifier which provides the required subscriber identification in the following way. Assuming a demand for service has been extended from a subscriber through a special trunk to a toll center, the toll center will respond with a signal through the trunk requesting a number to identify the calling subscriber. This signal requesting identification is routed by the trunk to an identifier circuit which acknowledges the demand and starts a sequencer. The sequencer sequentially reads the calling number from an identification matrix and drives a Multifrequency Sender, which in turn sends the identification digits to the toll center via the special trunk. When a party line is involved, a test is made to determine which party is calling and appropriate additional signals are routed to the CAMA center.

The novel features characteristic of this invention are set forth with particularlity in the appended claims. The invention itself, however, both as to its organization and its method of operation together with additional objects and advantages thereof, will be understood from the following description of a specific embodiment when read in connection with the accompanying drawing in which the sole FIGURE is a diagram depicting a system arrangement according to the invention.

Turn to the FIGURE for a general view of the invention. When the subscriber station party 1 or party 2 goes off-hook, it is connected through tip and ring conductors T and R to a line circuit (not shown) forming part of the central office equipment 1, (COE). Dial tone is returned if the system is available for calls. If a toll call is being placed, the subscriber then dials an access code. The trunk circuit 4 is seized over the central office loop, including tip and ring conductors T1 and R1, usually from a selector level. Ground is returned on the sleeve lead S1 and the CAMA toll center 6 is seized by an outgoing loop including tip T2 and ring R2 on loop trunks. The subscriber then dials the area code and the called subscriber's number. When this is complete, answer supervision is returned from the toll center by loop battery reversal.

On receiving answer supervision as described above, the CAMA trunk circuit 4 extends a demand-in signal DI into the identifier access guard circuit 8. If no other CAMA trunk circuits are accessing the identifier at this time, a demand-out signal (DO) is returned to the trunk circuit 4, operating appropriate circuits (not shown) to close the make contacts A and B shown in the FIGURE, thereby permitting access to the identifier shown below the dash-dot line 60.

When the CAMA trunk circuit 4 has been connected to the identifier, the subscriber's sleeve lead S1 is extended into the identifier where it is connected to the tone generator 10 and is also terminated on the matrix 22. The location at which the sleeve terminates in the matrix corresponds to the part of the subscriber's number that he shares with the other party on his line.

The matrix, in response to the tone from oscillator 10, feeds signals to circuits (not shown) which collectively operate to supply the calling subscriber number (without distinguishing between parties 1 and 2) to the CAMA center 6. Full details of this operation are available in the patent application identified above and are repeated here only to the extent necessary to enable the reader to attain a clear understanding of the present invention.

Tone from the generator 10 is extended via the line 30 and in response to an identification demand signal at 32, over the AND gate 34 and via line T1, the Central Office Equipment and line T to party number 1 and party number 2. The identification demand signal also enables the party 2 to trigger one-shot multivibrator at 40. In the circuit shown, if party number 1 is off-hook the tone over line T will pass through closed contacts to line R, the line circuit in 1, the line R1, make contact B and the line 36 to cause an output from integrator circuit 38. The integrator output will set the flip-flop FF1 and reset the flip-flop FF2. The output of FF1 will go to a driver DR1 to operate a relay R1 which will close contacts (not shown) to provide an indication that party number 1 is calling.

If the calling party is party number 2, the tone from 10 will be applied across diodes D1, D2, D3 and D4 at a potential level insufficient to break down the diodes. The integrator 38 is not operated and after a 10 millisecond period, the trigger one-shot 40 gives an output to set FF2. An output from FF2 will then pass through the driver DR2 to operate the party 2 relay R2 enabling provision of an indication that the calling subscriber is party 2.

After the identification cycle has been completed, a sequencer 50 will operate to reset any operated flip-flop FF1 or FF2.

While the principles of the invention have been described above in connection with specific apparatus and application, it is to be understood that this description is made only by way of example and not as a limitation on the scope of the invention.

We claim:

1. An identification circuit for identifying individual parties in a party line system and for enabling the supply of party identification to a central identification system, wherein the improvement comprises:
   - means for receiving an identification demand signal;
   - a tone generator for supplying an AC tone;
   - means responsive to an identification demand signal to connect AC tone to a first line of a party line;
   - a first subscriber connectable directly between the first line and a second line of the party line;
   - a second subscriber connectable in series with an attenuator between the first and second lines of the party line;
   - a control circuit connected by a first terminal to the second line, and by a second terminal to receive the identification demand signal;
   - said control circuit responding to the presence of AC tone on the first terminal and an identification demand signal on the second terminal to operate means for supplying an indication that the first party is calling;
   - said control circuit responding to the absence of AC tone on the first terminal simultaneously with the presence of an identification demand signal on the second terminal to operate means for supplying an indication that the second party is calling;
   - the control circuit including a one-shot trigger circuit settable by the identification demand signal to provide a time delay after which it provides a delayed pulse;
   - a flip-flop circuit providing an output signal in response to the delayed pulse from said trigger circuit; and
   - said output signal operating he means indicating that the second party is calling.